April 29, 1930. L. L. NEEBE Re. 17,652
SUPPORT FOR LOCOMOTIVE AIR PUMPS, ETC
Original Filed May 5, 1927
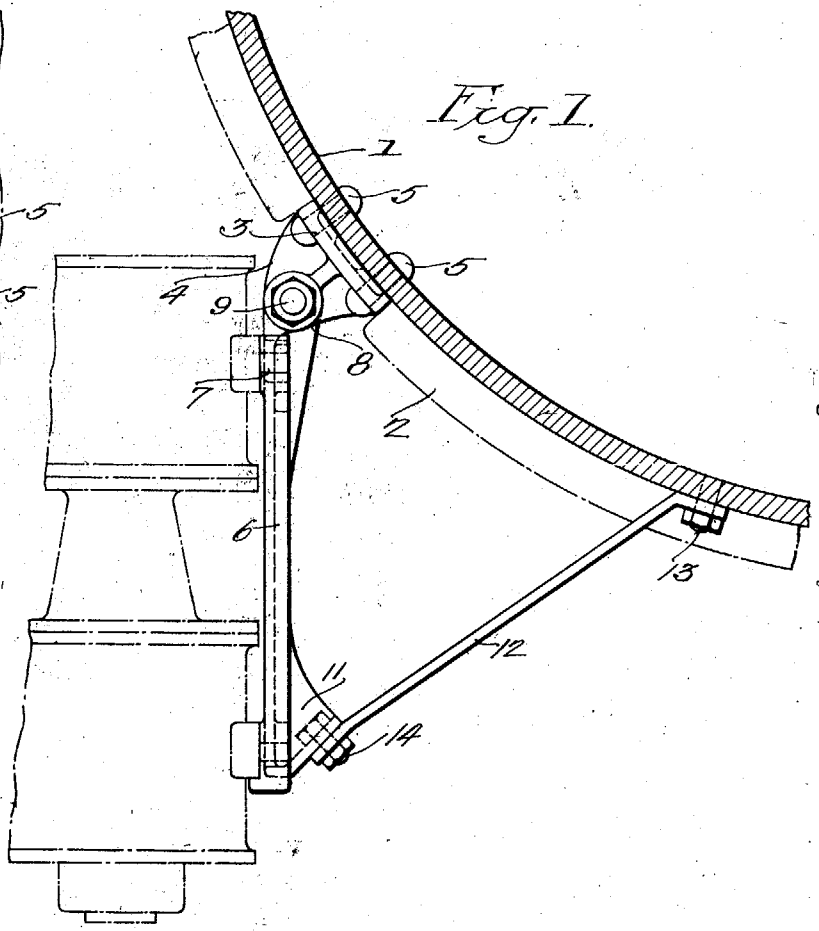
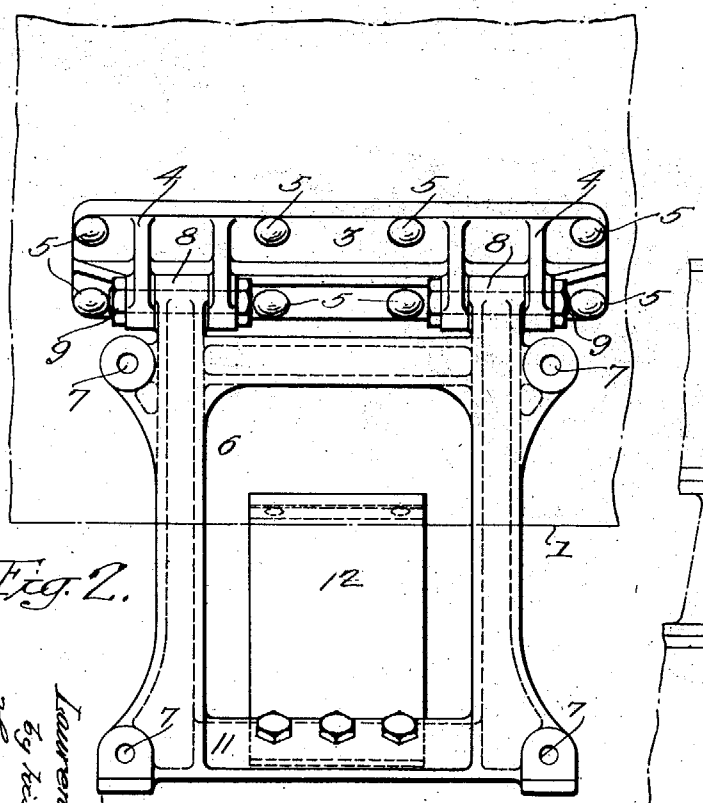
Inventor:
Laurence L. Neebe
by his Attorneys,
Hoover & Timson Reissued Apr. 29, 1930

Re. 17,652

UNITED STATES PATENT OFFICE

LAWRENCE L. NEEBE, OF WOODBURY, NEW JERSEY

SUPPORT FOR LOCOMOTIVE AIR PUMPS, ETC.

Original No. 1,668,570, dated May 8, 1928, Serial No. 188,991, filed May 5, 1927. Application for reissue filed March 20, 1930. Serial No. 438,848.

My invention relates to certain improvements in supports which are secured to the boilers of locomotives and which carry the air pumps or feed water-heater pumps, and in some instances are used to carry the power reverse cylinders.

One object of my invention is to so design the support that it can be secured in proper position on the boiler of a locomotive or other object, and can be adjusted and held in position after adjustment.

A further object of the invention is to provide one type of support that can be used on different forms or types of boilers. Heretofore, it has been the practice to design an air pump support for each type of boiler.

In the accompanying drawing:

Fig. 1 is a sectional view of a portion of a locomotive boiler showing my improved support secured thereto; and Fig. 2 is a face view of the support.

1 is a locomotive boiler having the ordinary lagging 2. Secured to the shell of the boiler is a bracket 3 having a base and two pairs of lugs 4 suitably braced as shown in Fig. 2. The base of the bracket 3 is on the same radius as the shell of the boiler, and is secured to the shell by rivets or studs 5 as desired.

The support for the air pump consists of a frame 6 having holes 7 for the bolts which secure the pump to the frame, and has knuckles 8 which extend between the lugs 4 of the bracket 3. Pivot-bolts 9, extend through openings in the lugs and in the knuckles. By the foregoing arrangement, the frame 6 is pivotally suspended from the bracket.

At the back of the frame, near the lower end thereof, is an extension 11 having an inclined face. A brace 12 of considerable width as shown in Fig. 2, is secured to the boiler by studs 13 and to the face of the extension 11 by bolts 14. This brace rigidly holds the frame in position after adjustment.

The cylinder of the air pump or other device can be attached to the frame before it is hung on the bracket, or it can be secured to the frame after the frame has been rigidly attached to the boiler.

By the above construction, the brackets and frames of the supports can kept in stock, and a bracket can be secured in any convenient position on the boiler so as to locate the air pump properly in position. All that is necessary at the time of installation is to cut the brace 12 to the proper length.

By the use of this invention, considerable time is saved in the erecting shop, as there is no necessity for using special fittings in view of the fact that the brackets and frames can be kept in stock.

I claim:

1. The combination in a support for air pumps and the like on a locomotive boiler, of a bracket having a base shaped to fit the shell of the boiler and having lugs projecting from the base; a frame having knuckles; pivot-bolts connecting the knuckles of the frame to the lugs on the bracket; and a wide brace plate secured to the lower end of the frame and to the shell of the boiler.

2. The combination in a support for locomotive air pumps and the like, of a bracket arranged to be secured to the shell of a locomotive boiler; a frame pivotally suspended from the bracket and arranged to carry an air pump or the like; and a rigid brace securing the lower end of the frame to the body of the boiler.

LAWRENCE L. NEEBE.